(12) United States Patent
Rubin

(10) Patent No.: US 12,132,949 B1
(45) Date of Patent: Oct. 29, 2024

(54) EFFICIENT PROGRAM CLOCK REFERENCE (PCR) MANAGEMENT IN CONVERGED CABLE ACCESS PLATFORM (CCAP)

(71) Applicant: Harmonic, inc., San Jose, CA (US)

(72) Inventor: Yaniv Rubin, Katzir (IL)

(73) Assignee: Harmonic, Inc., San Jose, CA (US)

( * ) Notice: Subject to any disclaimer, the term of this patent is extended or adjusted under 35 U.S.C. 154(b) by 449 days.

(21) Appl. No.: 17/687,434

(22) Filed: Mar. 4, 2022

Related U.S. Application Data

(60) Provisional application No. 63/156,836, filed on Mar. 4, 2021.

(51) Int. Cl.
*H04N 21/43* (2011.01)
*H04L 12/28* (2006.01)
*H04N 21/236* (2011.01)
*H04N 21/242* (2011.01)
*H04N 21/61* (2011.01)

(52) U.S. Cl.
CPC ..... *H04N 21/4305* (2013.01); *H04L 12/2801* (2013.01); *H04N 21/23608* (2013.01); *H04N 21/242* (2013.01); *H04N 21/6118* (2013.01)

(58) Field of Classification Search
CPC ......... H04N 21/4305; H04N 21/23608; H04N 21/242; H04N 21/6118; H04N 7/17309; H04L 12/2801; H04L 7/02; H03K 5/1565
See application file for complete search history.

(56) References Cited

U.S. PATENT DOCUMENTS 9,172,914 B1 * 10/2015 Wheelock .......... H04N 7/17309
2022/0248069 A1 * 8/2022 Garvey ................ H03K 5/1565

FOREIGN PATENT DOCUMENTS

CN 101282483 A * 10/2008 ............... H04L 7/02

* cited by examiner

*Primary Examiner* — Vinncelas Louis
(74) *Attorney, Agent, or Firm* — Brokaw Patent Law, PC; Christopher J. Brokaw

(57) ABSTRACT

Assigning a program clock reference (PCR) value to a PCR packet. A theoretical input time and a theoretical output time is determined for a PCR packet received by a Remote PHY device (RPD) or a Remote MACPHY Device (RMD). A corrected PCR value is assigned to the PCR packet, based at least in part, on the theoretical output time and the theoretical output time. Then, the PCR packet having the corrected PCR value is transmitted to customer premises equipment (CPE) in a Converged Cable Access Platform (CCAP). Assigning a corrected PCR value to the PCR packet may be performed without learning an encoding rate associated with a program to which the PCR value is assigned.

21 Claims, 3 Drawing Sheets

DETERMINE THEORETICAL INPUT TIME FOR A PCR PACKET
210

DETERMINE THEORETICAL OUTPUT TIME FOR A PCR PACKET
220

DETERMINE AND ASSIGN A CORRECTED PCR VALUE FOR THE PCR PACKET BASED ON THE THEORETICAL INPUT AND OUTPUT TIME
230

EFFICIENT PROGRAM CLOCK REFERENCE (PCR) MANAGEMENT IN CONVERGED CABLE ACCESS PLATFORM (CCAP)

CLAIM OF PRIORITY

This application claims priority to U.S. Provisional Patent Application Ser. No. 63/156,836, filed Mar. 4, 2021, invented by Yaniv Rubin, entitled "RPD Full PCR Solution," the entire contents of which are hereby incorporated by reference for all purposes as if fully set forth herein.

FIELD OF THE INVENTION

Embodiments of the invention generally relate to delivering video over a Converged Cable Access Platform (CCAP) platform, and more specifically relate to efficient program clock reference (PCR) management in a Converged Cable Access Platform (CCAP).

BACKGROUND

A Converged Cable Access Platform (CCAP) is an industry standard platform for transmitting video data and voice content. The MHAv2 specifications (Modular Headend Architecture version 2 issued by CableLabs of Louisville, Colorado) describe how a CCAP platform is separated into two portions, (1) a CCAP Core located at a cable headend, and (2) a number of Remote PHY devices (RPDs), which are typically located outdoors. A RPD may be located, for example, at the junction of the fiber and coax plants in an optical node serving as a Remote PHY Node (RPN). A CCAP core can control and setup data paths with multiple RPDs situated in multiple fiber nodes. FIG. 1 is a block diagram of a CCAP platform which includes an RPD situated inside an RPN in accordance with the MHAv2 specifications of the prior art.

CableLabs has also issued a technical report about the R-MACPHY architecture and is formalizing a specification for R-MACPHY products, specifically a Remote MACPHY Device (RMD) which resides in a Remote MACPHY node (RMN). This technical report describes Remote MACPHY (or MAC-PHY) as a generic term given to the distributed CMTS/CCAP architecture where the DOCSIS MAC and PHY layer processing of a CMTS are moved from the headend down to a Fiber Node location. Certain CCAP platforms may employ a RMD instead of a RPD to support migrating some of the traditional functionality typically performed at the CCAP Core to be performed at the RMD, which is advantageous in certain situations in reducing latency.

When a CCAP platform is used to stream a video to customer premises equipment (CPE), such as a television or mobile device, the video is typically transmitted from the cable headend to the CPE by way of a fiber node comprising at least one RPD or RMD. The cable headend typically sends to each RPD or RMD a data stream comprising multiple video streams, each of which is itself a multiple program transport stream (MPTS). Each RPD or RMD processes multiple MPTS, and thereafter outputs each MPTS on a specific QAM modulated stream over a Radio Frequency (RF) interface to be propagated to one or more CPEs.

The DOCSIS specification (CM-SP-R-DEPI-I12-190307—sections: 5.3.2, 5.3.2.1, 5.3.2.2) defines 2 modes of video transmission: synchronous mode and asynchronous mode. In asynchronous mode, neither an RPD nor a RMD makes any assumptions about the clock frequencies of the CCAP Core.

Each MPTS service that is streamed from the cable headend to each RPD or RMD is sent as a constant bit rate (CBR) stream. However, the actual rate of the CBR stream (i.e., the encoded rate at which the digital video is meant to be played) is not synchronized to the transmission rate across the RF interface (i.e., the rate at which the digital video is being delivered to the CPE). Since the bit rate of the encoded CBR stream received at a RPD or RMD is not identical to its output transmission rate, there is a need for the RPD or RMD to add or remove null packets from the input stream in order to generate the exact required CBR rate at its output. This effort is in addition to jitter caused by varying network conditions.

Each MPTS stream is made of several programs that each has a Program Clock reference (PCR), unless multiple streams share the same common PCR. A PCR is a mechanism used to play a digital video at the intended rate, i.e., the bit rate at which the digital video was encoded. A PCR is implemented as a series or sequence of PCR values. A PCR value is used to lock or synchronize the time measured by an encoder with a specific time measurement (i.e., the PCR value) carried by a specific packet (the "PCR packet") in a stream of packets. PCR packets that each contain a PCR value are inserted at more or less regular intervals within a digital video stream by the encoder.

Any insertion or removal of packets into or from a stream changes the relative position of the PCR packets around the added or removed packets and, as a result, introduces inaccuracies to PCR values in the stream. However, as previously discussed, RPDs and RMDs often are required to add or remove packets to or from a stream because the actual rate of the incoming CBR stream is not synchronized with the transmission rate across the RF interface. Thus, there is a pressing issue of PCR values becoming increasingly inaccurate over time.

Presently, there are two known approaches for keeping PCR values accurate. A first known approach involves using knowledge of different clock rates to transmit packets at the exact time that the encoder originally intended. Since the clock used by the encoder (the "encoder clock") is not synchronized with the clock used by the RPD or RMD (the "local clock"), then each RPD or RMD is required to learn the clock differences between the encoder clock and the local clock and compensate for that difference so that each packet is sent at the exact time the encoder initially intended. This is done by storing the packets in the RPD buffers and sending them at the exact time The problem with this approach is that it requires a very big buffer for each stream assigned a unique set of PCR values. Each RPD and RMD must keep streaming at a constant rate all the times, including when packets are experiencing jitter in the input as well as when the rate of the incoming CBR streams is different than the transmission rate across the RF interface. Moreover, there is a need to hold enough packets in the stream in order to compensate both for the jitter and for the rate differences while avoiding underflows at all time. Consequently, this approach adds significant transmission delay as well as places a heavily computational processing burden upon each RPD and RMD in the CCAP platform.

A second known approach for keeping PCR values accurate involves changing PCR values assigned to PCR packets to a new value that would suit the actual delivery time. This approach is based on applying a phase lock loop (PLL) on each program and every PCR value to learn the rate differences between the encoding rate of each specific program and the output transmission rate of the RPD or RMD across the RF interface. This discovered difference in rate is used to generate adjusted PCR values, which are assigned by a RPD or RMD to PCR packets to replace the original PCR value for that PCR packet. A disadvantage of this approach is that it is necessary to learn the encoding rate associated with each program that holds PCR and manage adjusted PCR values that corresponding values of that PCR. The number of programs supported by the CCAP platform may be quite large. Also, the actual number of programs in each MPTS can vary and the total number supported by a CCAP platform may grow and shrink and the programs themselves may frequently change, which often happens in video on demand (VOD) streams. Consequently, this approach requires significant computational resources at each RPD and/or RMD to manage all PCRs and the ever-changing state of programs, which is burdensome and costly.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DESCRIPTION OF EMBODIMENTS OF THE INVENTION

Approaches for assigning a program clock reference (PCR) value to a PCR packet are presented herein. Advantageously, embodiments enable the use and management of PCR values in a CCAP platform with less expenditure of computational resources, thereby saving both financial resources as well as minimizing the impact to the physical environment. In the following description, for the purposes of explanation, numerous specific details are set forth to provide a thorough understanding of the embodiments of the invention described herein. It will be apparent, however, that the embodiments of the invention described herein may be practiced without these specific details. In other instances, well-known structures and devices are shown in block diagram form or discussed at a high level to avoid unnecessarily obscuring teachings of embodiments of the invention.

Figure 1:
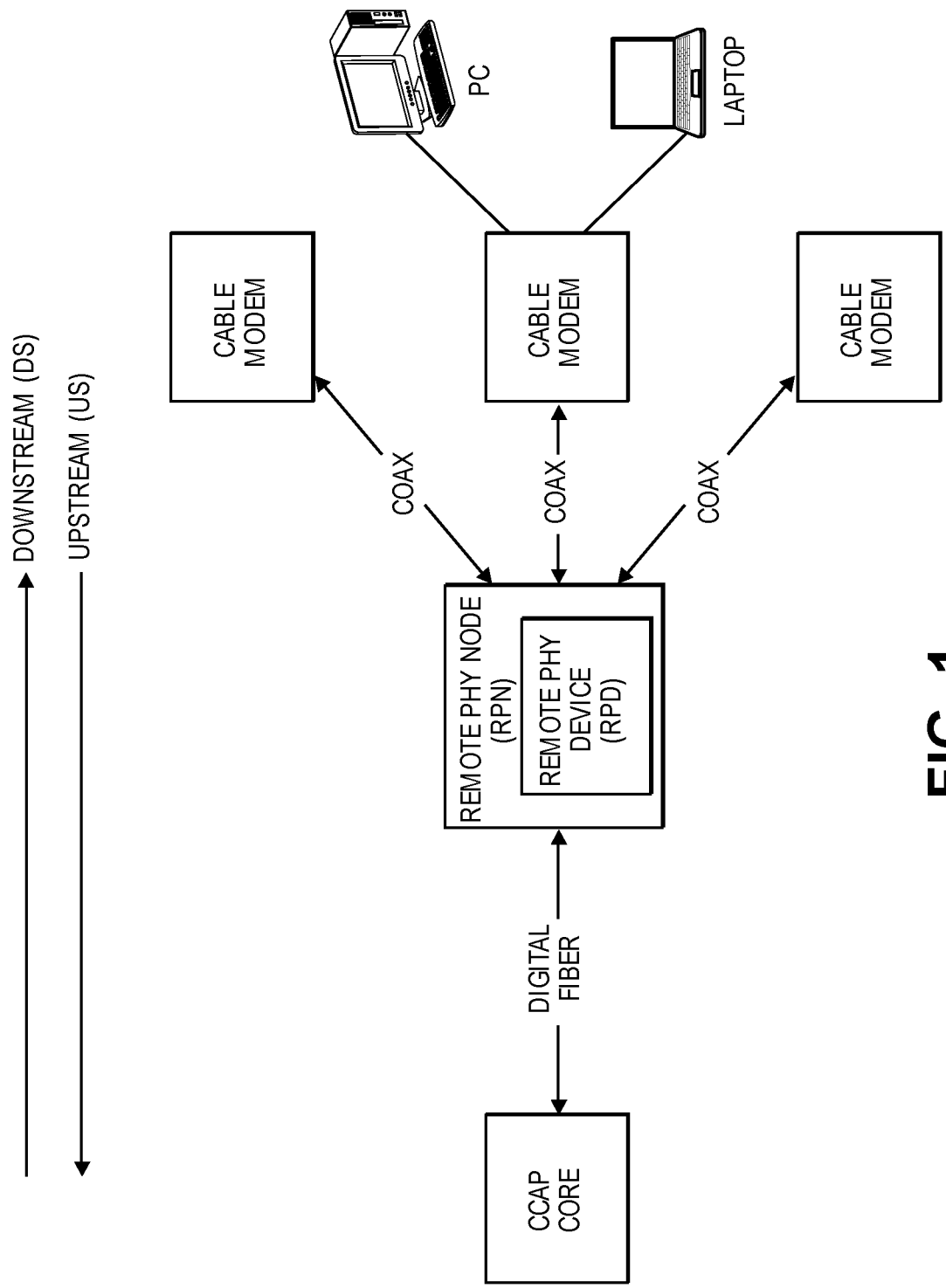
FIG. 1 is a block diagram of a CCAP platform which includes an RPD situated inside an RPN in accordance with the MHAv2 specifications of the prior art.
Figure 2:
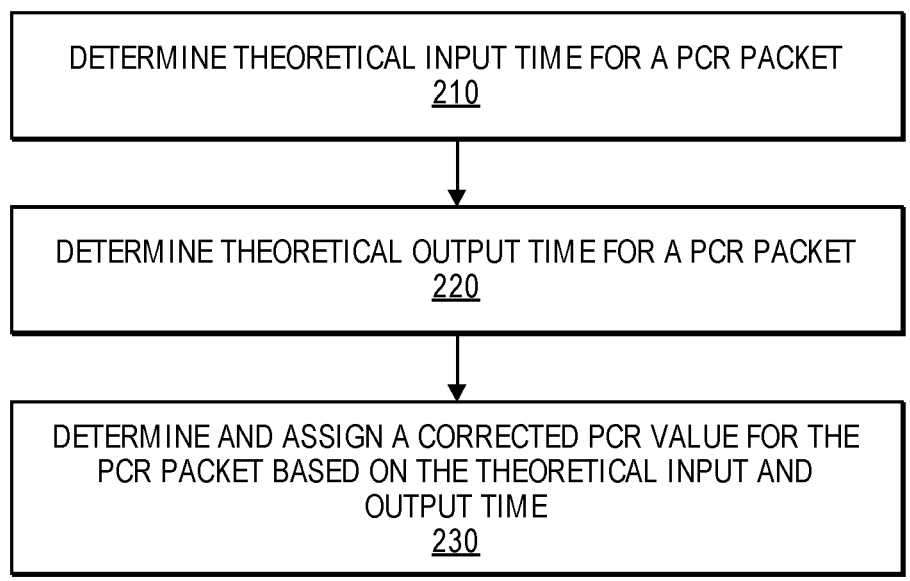
FIG. 2 is a flowchart illustrating the functional steps of assigning a program clock reference (PCR) value to a PCR packet in accordance with an embodiment of the invention.

Embodiments of the invention are directed towards an improved approach for the management and use of PCR values. Embodiments may be used at a fiber node, such as but not limited to at a Remote PHY node (RPN) and a Remote MACPHY node (RMN), of a CCAP platform. FIG. 2 is a flowchart illustrating the functional steps of assigning a program clock reference (PCR) value to a PCR packet in accordance with an embodiment of the invention. The steps of FIG. 2 may be performed at a location within a CCAP platform between a CCAP core and customer premises equipment; for example, the steps of FIG. 2 may be performed at a Remote PHY Device (RPD) comprised within a RPN or a Remote MACPHY Device (RMD) comprised within a Remote MACPHY node (RMN). For purpose of providing a concrete example, the steps of FIG. 2 may be explained with reference to being performed at a RPD; however, embodiments of the invention may be employed at a variety of locations within a CCAP platform.

FIG. 2 depicts the steps of calculating a single PCR value for a PCR associated with a program carried by a multiple program transport stream (MPTS). The steps of FIG. 2 may be performed for each PCR packet and for each program carried by the MPTS which is associated with a unique PCR.

In step 210, an RPD determines a theoretical input time for a received PCR packet. The theoretical input time for the PCR packet is the theoretical time that the PCR packet arrived at the RPD.

The theoretical input time for a TS packet according to an embodiment is given below in Equation 1:

$$\text{theoretical input time} = (\text{last pulse time} + \text{FIFO-Level}) * \text{packet period}, \quad \text{Equation 1}$$

where packet period=the number of bits per packet/bit rate

The "last pulse time" is the value of the time counter of packets as they arrive. A Virtual de-jitter FIFO is a counter that starts at 0 and increases by 1 whenever a packet enters the RPD and decreases by 1 at every pulse that represent the time a packet was expected to enter to the RPD. The FIFO-Level is the value of the Virtual de-jitter FIFO counter at the time that a new packet enters the RPD. This value could be either positive or negative.

Figure 3:
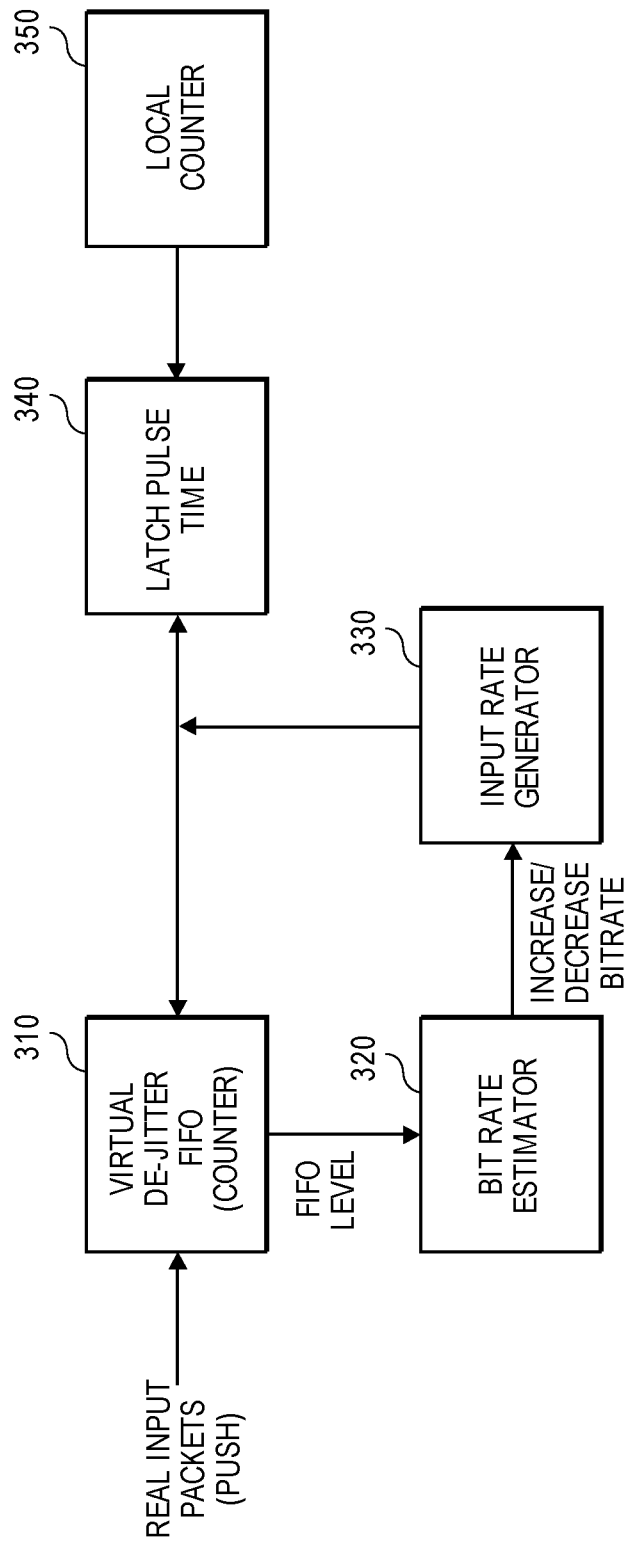
FIG. 3 is a block diagram illustrating a process of determining a theoretical input time in accordance with an embodiment of the invention.

FIG. 3 is a block diagram illustrating an illustrative process of determining a theoretical input time that may be used by an embodiment of the invention. As shown in FIG. 3, a phase lock loop (PLL) may be used by a RPD to process each received MPTS stream. Use of the PLL on each received MPTS allows the fiber node to overcome jitter and ascertain the exact rate of the incoming MPTS stream. This calculated rate is used to determine the 'theoretical input time' of each packet. The theoretical input time assumes a constant bitrate stream that experiences no jitter. The theoretical input time of each packet may be in the past or in the future so long as the theoretical input time is accurate relative to the theoretical input time of the other packets in the stream.

Thereafter, in step 230, the RPD determines a theoretical output time for the PCR packet. Because a transport stream (TS) packet is transmitted inside an Ethernet IP frame, there is a need to adjust for the TS packet in the IP frame. The theoretical output time for a TS packet according to an embodiment is given below in Equation 2:

$$\text{theoretical output time} = \text{theoretical transmit time} + (\text{position of the TS packet in the IP frame} - 1) * \text{packet period}, \quad \text{Equation 2}$$

where packet period=the number of bits per packet/bit rate

Figure 4:
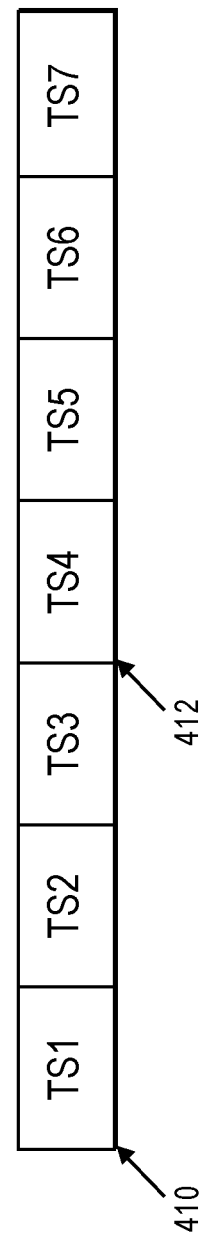
FIG. 4 is an illustration of a series of transport packets in an IP frame to assist a discussion of theoretical output time in accordance with an embodiment of the invention.

To illustrate how Equation 2 may be employed using a concrete example, consider FIG. 4, which is an illustration of a series of transport packets in an IP frame to assist a discussion of theoretical output time in accordance with an embodiment of the invention. In the example of FIG. 4, assume that TS packet 1 (TS1 in FIG. 4) and TS packet 4 (TS4 in FIG. 4) contain PCR value. The position of TS1 in the IP frame is at location 410, which is a value of 1 since TS1 is the first TS packet in the IP frame. The position of TS4 in the IP frame is at location 412, which is a value of 4 since TS1 is the fourth TS packet in the IP frame behind TS1-TS3.

When a RPD outputs a packet onto a stream to be delivered to a CPE, the delivery process employed by the RPD determines the exact delivery time for each packet in the QAM according to the QAM rate. At this delivery time, the RPD may either (a) send a regular video packet that waits in this QAM's buffer, or (b) send a generated null packet when there is no video packet waiting to be sent. The exact time that the packet should to be sent as determined by the delivery process employed by the RPD is the "theoretical transmit time. The theoretical transmit time is separate from the actual transmit time, which may occur later and depends on many factors.

In step 230, the RPD determines a corrected PCR value for the PCR packet. Thereafter, the RPD assigns that corrected PCR value to that PCR packet. After the PCR packet has been updated with the corrected PCR value, the RPD may proceed with transmitting the PCR packet to its destination.

The corrected PCR value for the PCR packet according to an embodiment is given below in Equation 3:

$$\text{Corrected PCR value} = \text{original PCR value} + \text{internal delay}, \quad \text{Equation 3}$$

where internal delay=theoretical output time−theoretical input time

When a RPD is about to transmit a PCR packet, the RPD updates the PCR value of the packet in accordance with the corrected PCR value shown above in Equation 3. Using the corrected PCR value of Equation 3 results in PCR values that are accurate with easy management and with minimal buffers. This is so, at least in part, because it is unnecessary for embodiments to learn the encoding rate associated with each PCR and manage adjusted PCR values that corresponding values of that PCR.

Advantageously, embodiments also achieve a low latency rate. For example, the latency that may be added by the RPD is very minimal and comparable to the amount of IP jitter at the input of the RPD; normally, the latency is less than 1 millisecond.

Embodiments may be implemented using a Field-Programmable Gate Array (FPGA) disposed in a RPD or a RMD. The FPGA may be configured or programmed to perform the steps of FIG. 2. The FPGA of an embodiment may, but need not, operate in tandem or otherwise receive information or instructions from software executing upon a virtual or physical processor. The term "non-transitory computer-readable storage medium" as used herein refers to any tangible medium that participates in persistently storing instructions or operational guidance which (a) may be provided to a processor for execution or (b) may be performed or otherwise carried out by a FPGA. Additional details about the operation of non-transitory computer-readable storage mediums may be found within U.S. Pat. No. 11,212,590, issued Dec. 28, 2021, entitled "Multiple Core Software Forwarding," the entire contents of which are hereby incorporated by reference for all purposes as if fully set forth herein.

In the foregoing specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium storing one or more sequences of instructions for assigning a program clock reference (PCR) value to a PCR packet, which when executed by one or more processors, cause:
   determining a theoretical input time and a theoretical output time for the PCR packet, wherein the theoretical input time for the PCR packet is based, at least in part, upon (a) a number of bits in said PCR packet, (b) a bit rate of said PCR packet, (c) a value of a time counter when said PCR packet arrived, and (d) a value of a de-jitter counter;
   assigning a corrected PCR value to the PCR packet, based at least in part, on said theoretical input time and said theoretical output time; and
   transmitting the PCR packet having the corrected PCR value to customer premises equipment (CPE) in a Converged Cable Access Platform (CCAP).

2. The non-transitory computer-readable storage medium of claim 1, wherein said determining, assigning, and transmitting are performed by a fiber node.

3. The non-transitory computer-readable storage medium of claim 1, wherein said determining, assigning, and transmitting are performed by a Remote PHY Device (RPD).

4. The non-transitory computer-readable storage medium of claim 1, wherein said determining, assigning, and transmitting are performed by a Remote MACPHY Device (RMD).

5. The non-transitory computer-readable storage medium of claim 1, wherein said assigning the corrected PCR value to the PCR packet does not involve learn an encoding rate associated with a program to which the PCR value is assigned.

6. The non-transitory computer-readable storage medium of claim 1, wherein the theoretical output time for the PCR packet is based, at least in part, upon (a) a theoretical transmit time for said PCR packet, (b) a position of an IP frame, (c) the number of bits in said PCR packet, and (d) the bit rate of said PCR packet.

7. The non-transitory computer-readable storage medium of claim 1, wherein said assigning the corrected PCR value to the PCR packet is performed by a Field-Programmable Gate Array (FPGA).

8. An apparatus for assigning a program clock reference (PCR) value to a PCR packet, comprising:
   first circuitry to determine a theoretical input time and a theoretical output time for the PCR packet received at the apparatus over a communications link, wherein the theoretical input time for the PCR packet is based, at least in part, upon (a) a number of bits in said PCR packet, (b) a bit rate of said PCR packet, (c) a value of a time counter when said PCR packet arrived, and (d) a value of a de-jitter counter;
   second circuitry to assign a corrected PCR value to the PCR packet, based at least in part, on said theoretical input time and said theoretical output time; and
   third circuitry to transmit the PCR packet having the corrected PCR value to customer premises equipment (CPE) in a Converged Cable Access Platform (CCAP).

9. The apparatus of claim 8, wherein said apparatus is a fiber node.

10. The apparatus of claim 8, wherein said apparatus is a Remote PHY Device (RPD).

11. The apparatus of claim 8, wherein said apparatus is a Remote MACPHY Device (RMD).

12. The apparatus of claim 8, wherein second circuitry does not learn an encoding rate associated with a program to which the PCR value is assigned.

13. The apparatus of claim 8, wherein the theoretical output time for the PCR packet is based, at least in part, upon (a) a theoretical transmit time for said PCR packet, (b) a position of an IP frame, (c) the number of bits in said PCR packet, and (d) the bit rate of said PCR packet.

14. The apparatus of claim 8, wherein said assigning the corrected PCR value to the PCR packet is performed by a Field-Programmable Gate Array (FPGA).

15. A method for assigning a program clock reference (PCR) value to a PCR packet, comprising:
    determining a theoretical input time and a theoretical output time for the PCR packet received at an apparatus over a communications link, wherein the theoretical input time for the PCR packet is based, at least in part, upon (a) a number of bits in said PCR packet, (b) a bit rate of said PCR packet, (c) a value of a time counter when said PCR packet arrived, and (d) a value of a de-jitter counter;
    assigning a corrected PCR value to the PCR packet, based at least in part, on said theoretical output input time and said theoretical output time; and
    transmitting the PCR packet having the corrected PCR value to customer premises equipment (CPE) in a Converged Cable Access Platform (CCAP).

16. The method of claim 15, wherein said determining, assigning, and transmitting are performed by a fiber node.

17. The method of claim 15, wherein said determining, assigning, and transmitting are performed by a Remote PHY Device (RPD).

18. The method of claim 15, wherein said determining, assigning, and transmitting are performed by a Remote MACPHY Device (RMD).

19. The method of claim 15, wherein said assigning the corrected PCR value to the PCR packet does not involve learn an encoding rate associated with a program to which the PCR value is assigned.

20. The method of claim 15, wherein the theoretical output time for the PCR packet is based, at least in part, upon (a) a theoretical transmit time for said PCR packet, (b) a position of an IP frame, (c) the number of bits in said PCR packet, and (d) the bit rate of said PCR packet.

21. The method of claim 15, wherein said assigning the corrected PCR value to the PCR packet is performed by a Field-Programmable Gate Array (FPGA).

* * * * *